(12) United States Patent
Marshall et al.

(10) Patent No.: US 9,130,963 B2
(45) Date of Patent: *Sep. 8, 2015

(54) ANCILLARY DATA SUPPORT IN SESSION INITIATION PROTOCOL (SIP) MESSAGING

(75) Inventors: Roger S. Marshall, Auburn, WA (US); Yinjun Zhu, Sammamish, WA (US)

(73) Assignee: TeleCommunication Systems, Inc., Annapolis, MD (US)

(*) Notice: Subject to any disclaimer, the term of this patent is extended or adjusted under 35 U.S.C. 154(b) by 155 days.

This patent is subject to a terminal disclaimer.

(21) Appl. No.: 13/064,653

(22) Filed: Apr. 6, 2011

(65) Prior Publication Data

US 2012/0259984 A1 Oct. 11, 2012

(51) Int. Cl.
| | | |
|---|---|---|
| *H04L 12/28* | (2006.01) | |
| *H04L 29/06* | (2006.01) | |
| *H04L 29/12* | (2006.01) | |

(52) U.S. Cl.
CPC ........ *H04L 65/1069* (2013.01); *H04L 29/0602* (2013.01); *H04L 29/06176* (2013.01); *H04L 29/06197* (2013.01); *H04L 61/309* (2013.01); *H04L 61/3085* (2013.01); *H04L 65/1006* (2013.01)

(58) Field of Classification Search
CPC .............. H04L 29/0602; H04L 29/06176; H04L 29/06197; H04L 61/3085; H04L 61/309; H04L 65/309
USPC .......... 709/206, 228, 227, 230; 370/412, 328, 370/352, 401; 455/466, 453; 379/266.02
See application file for complete search history.

(56) References Cited

U.S. PATENT DOCUMENTS

| | | | |
|---|---|---|---|
| 1,103,073 | A | 7/1914 | O'Connell |
| 4,445,118 | A | 4/1984 | Taylor et al. |
| 4,494,119 | A | 1/1985 | Wimbush |
| 4,651,156 | A | 3/1987 | Martinez |
| 4,706,275 | A | 11/1987 | Kamil |
| 4,891,638 | A | 1/1990 | Davis |
| 4,891,650 | A | 1/1990 | Sheffer |
| 4,952,928 | A | 8/1990 | Carroll |
| 4,972,484 | A | 11/1990 | Theile |
| 5,014,206 | A | 5/1991 | Scribner |
| 5,043,736 | A | 8/1991 | Darnell |
| 5,055,851 | A | 10/1991 | Sheffer |

(Continued)

FOREIGN PATENT DOCUMENTS

| | | |
|---|---|---|
| SE | WO9921380 | 4/1999 |
| WO | WO00/40038 | 7/2000 |

(Continued)

OTHER PUBLICATIONS

Van de Sompel et al., "RFC 4452 The info URI Scheme," Apr. 2006, The Internet Society, pp. 1-17.*

(Continued)

*Primary Examiner* — Le H Luu
(74) *Attorney, Agent, or Firm* — William H. Bollman

(57) ABSTRACT

A SIP ancillary data server provides host to auxiliary data for an emergency SIP session (call) uniquely referred to in a transported SIP header. In a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

18 Claims, 3 Drawing Sheets

(56) References Cited

U.S. PATENT DOCUMENTS

| | | |
|---|---|---|
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,122,503 A | 9/2000 | Daly |
| 6,122,520 A | 9/2000 | Want |

(56) References Cited

U.S. PATENT DOCUMENTS

| | | |
|---|---|---|
| 6,124,810 A | 9/2000 | Segal |
| 6,128,664 A | 10/2000 | Yanagidate |
| 6,131,067 A | 10/2000 | Girerd |
| 6,133,874 A | 10/2000 | Krasner |
| 6,134,483 A | 10/2000 | Vayanos |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,675,017 B1 | 1/2004 | Zellner |
| 6,677,894 B2 | 1/2004 | Sheynblat |
| 6,680,694 B1 | 1/2004 | Knockheart |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,396 B2 | 4/2004 | Chin |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |

(56) References Cited

U.S. PATENT DOCUMENTS

| | | |
|---|---|---|
| 6,757,544 B2 | 6/2004 | Rangarajan |
| 6,771,742 B2 | 8/2004 | McCalmont |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,842,715 B1 | 1/2005 | Gaal |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,996,720 B1 | 2/2006 | DeMello |
| 6,999,782 B2 | 2/2006 | Shaughnessy |
| 7,020,480 B2 | 3/2006 | Coskun |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Maggenti |
| 7,177,397 B2 | 2/2007 | McCalmont |
| 7,177,399 B2 | 2/2007 | Dawson |
| 7,184,418 B1 | 2/2007 | Baba |
| 7,200,380 B2 | 4/2007 | Havlark |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,246,187 B1 | 7/2007 | Erza |
| 7,260,186 B2 | 8/2007 | Zhu |
| 7,321,773 B2 | 1/2008 | Hines |
| 7,366,157 B1 | 4/2008 | Valentine |
| 7,440,442 B2 | 10/2008 | Grabelsky |
| 7,573,982 B2 | 8/2009 | Breen |
| 7,623,447 B1 | 11/2009 | Faccin |
| 7,702,081 B1 | 4/2010 | Klesper |
| 7,783,297 B2 | 8/2010 | Ishii |
| 7,822,391 B1 | 10/2010 | Delker |
| 7,895,263 B1 | 2/2011 | Kirchmeier |
| 8,014,945 B2 | 9/2011 | Cooper |
| 2001/0011247 A1 | 8/2001 | O'Flaherty |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069529 A1 | 6/2002 | Wieres |
| 2002/0085538 A1 | 7/2002 | Leung |
| 2002/0086659 A1 | 7/2002 | Lauper |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0174073 A1 | 11/2002 | Nordman |
| 2003/0009602 A1 | 1/2003 | Jacobs |
| 2003/0013449 A1 | 1/2003 | Hose |
| 2003/0016804 A1 | 1/2003 | Sheha |
| 2003/0037163 A1 | 2/2003 | Kitada |
| 2003/0040272 A1 | 2/2003 | Lelievre |
| 2003/0063730 A1 | 4/2003 | Woodring |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086539 A1 | 5/2003 | McCalmont |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119521 A1 | 6/2003 | Tipnis |
| 2003/0119528 A1 | 6/2003 | Pew |
| 2003/0125045 A1 | 7/2003 | Riley |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0163483 A1 | 8/2003 | Zingher |
| 2003/0186709 A1 | 10/2003 | Rhodes |
| 2003/0187803 A1 | 10/2003 | Pitt |
| 2003/0196105 A1 | 10/2003 | Fineberg |
| 2003/0204640 A1 | 10/2003 | Sahineja |
| 2003/0223381 A1 | 12/2003 | Schroderus |
| 2004/0002326 A1 | 1/2004 | Maher |
| 2004/0043775 A1 | 3/2004 | Kennedy |
| 2004/0044623 A1 | 3/2004 | Wake |
| 2004/0068724 A1 | 4/2004 | Gardner |
| 2004/0098497 A1 | 5/2004 | Banet |
| 2004/0125941 A1* | 7/2004 | Yoakum .......... 379/266.02 |
| 2004/0132465 A1 | 7/2004 | Mattila |
| 2004/0146040 A1 | 7/2004 | Phan-Anh |
| 2004/0152469 A1* | 8/2004 | Yla-Outinen et al. ........ 455/453 |

(56) References Cited

U.S. PATENT DOCUMENTS

| | | |
|---|---|---|
| 2004/0176123 A1 | 9/2004 | Chin |
| 2004/0198332 A1 | 10/2004 | Lundsgaard |
| 2004/0203732 A1 | 10/2004 | Brusilovsky |
| 2004/0205151 A1 | 10/2004 | Sprigg |
| 2004/0215687 A1 | 10/2004 | Klemba |
| 2004/0225740 A1 | 11/2004 | Klemba |
| 2004/0229632 A1 | 11/2004 | Flynn |
| 2004/0242238 A1 | 12/2004 | Wang |
| 2004/0267445 A1 | 12/2004 | De Luca |
| 2005/0021769 A1 | 1/2005 | Kim |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Ioppe |
| 2005/0043038 A1 | 2/2005 | Maanoja |
| 2005/0053209 A1 | 3/2005 | D'Evelyn |
| 2005/0086467 A1 | 4/2005 | Asokan |
| 2005/0090236 A1 | 4/2005 | Schwinke |
| 2005/0111630 A1 | 5/2005 | Potorney |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0153706 A1 | 7/2005 | Niemenmaa |
| 2005/0169248 A1 | 8/2005 | Truesdale |
| 2005/0190892 A1 | 9/2005 | Dawson |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0259675 A1 | 11/2005 | Tuohino |
| 2005/0287979 A1 | 12/2005 | Rollender |
| 2006/0053225 A1 | 3/2006 | Poikselka |
| 2006/0058951 A1 | 3/2006 | Cooper |
| 2006/0128395 A1 | 6/2006 | Muhonen |
| 2006/0165060 A1* | 7/2006 | Dua ................... 370/352 |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0234639 A1 | 10/2006 | Kushwaha |
| 2006/0234698 A1 | 10/2006 | Fok |
| 2006/0239205 A1 | 10/2006 | Warren |
| 2006/0258380 A1 | 11/2006 | Liebowitz |
| 2006/0281470 A1 | 12/2006 | Shi |
| 2006/0293066 A1 | 12/2006 | Edge |
| 2007/0004429 A1 | 1/2007 | Edge |
| 2007/0010248 A1 | 1/2007 | Dravida |
| 2007/0021098 A1 | 1/2007 | Rhodes |
| 2007/0026854 A1 | 2/2007 | Nath |
| 2007/0026871 A1 | 2/2007 | Wager |
| 2007/0030539 A1 | 2/2007 | Nath |
| 2007/0041513 A1 | 2/2007 | Gende |
| 2007/0049288 A1 | 3/2007 | Lamprecht |
| 2007/0060097 A1 | 3/2007 | Edge |
| 2007/0117574 A1 | 5/2007 | Watanabe |
| 2007/0117577 A1 | 5/2007 | Harris |
| 2007/0149166 A1 | 6/2007 | Turcotte |
| 2007/0149213 A1 | 6/2007 | Lamba |
| 2007/0160036 A1 | 7/2007 | Smith |
| 2007/0201623 A1 | 8/2007 | Hines |
| 2007/0206620 A1* | 9/2007 | Cortes et al. ............ 370/412 |
| 2007/0213078 A1* | 9/2007 | Shaheen ................ 455/466 |
| 2007/0253429 A1 | 11/2007 | James |
| 2007/0254625 A1 | 11/2007 | Edge |
| 2007/0291733 A1 | 12/2007 | Doran |
| 2008/0045250 A1 | 2/2008 | Hwang |
| 2008/0080525 A1* | 4/2008 | Chatilov et al. ............ 370/401 |
| 2008/0137624 A1 | 6/2008 | Silverstrim |
| 2008/0151870 A1* | 6/2008 | Stucker et al. ............ 370/352 |
| 2008/0162637 A1 | 7/2008 | Adamczyk |
| 2008/0176582 A1 | 7/2008 | Ghai |
| 2008/0192731 A1 | 8/2008 | Dickinson |
| 2008/0192733 A1* | 8/2008 | Song et al. ............ 370/352 |
| 2008/0200182 A1 | 8/2008 | Shim |
| 2008/0267167 A1* | 10/2008 | Apelqvist ............ 370/352 |
| 2008/0285544 A1* | 11/2008 | Qiu et al. ............ 370/352 |
| 2009/0003535 A1 | 1/2009 | Grabelsky |
| 2009/0067417 A1 | 3/2009 | Kalavade |
| 2009/0097450 A1 | 4/2009 | Wallis |
| 2009/0125628 A1* | 5/2009 | Dahlen ................ 709/227 |
| 2009/0128404 A1 | 5/2009 | Martino |
| 2009/0168698 A1* | 7/2009 | Weniger et al. ............ 370/328 |
| 2009/0177785 A1* | 7/2009 | Reid et al. ............ 709/228 |
| 2009/0221263 A1 | 9/2009 | Titus |
| 2009/0237210 A1 | 9/2009 | Ciesla |
| 2010/0003976 A1 | 1/2010 | Zhu |
| 2010/0054220 A1 | 3/2010 | Bischinger |
| 2010/0067444 A1 | 3/2010 | Faccin |
| 2010/0076767 A1 | 3/2010 | Vieri |
| 2010/0167760 A1 | 7/2010 | Kim |
| 2010/0188992 A1 | 7/2010 | Raleigh |
| 2010/0198933 A1 | 8/2010 | Smith |
| 2010/0223222 A1 | 9/2010 | Zhou |
| 2010/0223339 A1* | 9/2010 | Cheng et al. ............ 709/206 |
| 2010/0233991 A1 | 9/2010 | Crawford |
| 2010/0262668 A1 | 10/2010 | Piett |
| 2011/0207429 A1 | 8/2011 | Maier |

FOREIGN PATENT DOCUMENTS

| | | |
|---|---|---|
| WO | WO02/057869 | 7/2002 |
| WO | WO2007027166 | 3/2007 |

OTHER PUBLICATIONS

International Search Report received in PCT/US2011/02001 dated Apr. 27, 2012.
International Search Report received in PCT/US2011/000100 dated Apr. 24, 2012.
Qualcomm CDMA Technologies, LBS Control Plane/User Plane Overview—80-VD378-1NP B, 2006, pp. 1-36.
Bhalla et al, TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 1-37.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
Peterson, A Presence-based GEOPRIV Location Object Format, Dec. 2005, pp. 1-24.
47 Code of Federal Regulations (Oct. 1, 2005 edition).
International Search Report received in PCT/US2012/067857 dated Feb. 20, 2013.
International Search Report received in PCT/US2012/67689 dated Feb. 22, 2013.
International Search Report received in PCT/US2012/066313 dated Feb. 4, 2013.

* cited by examiner

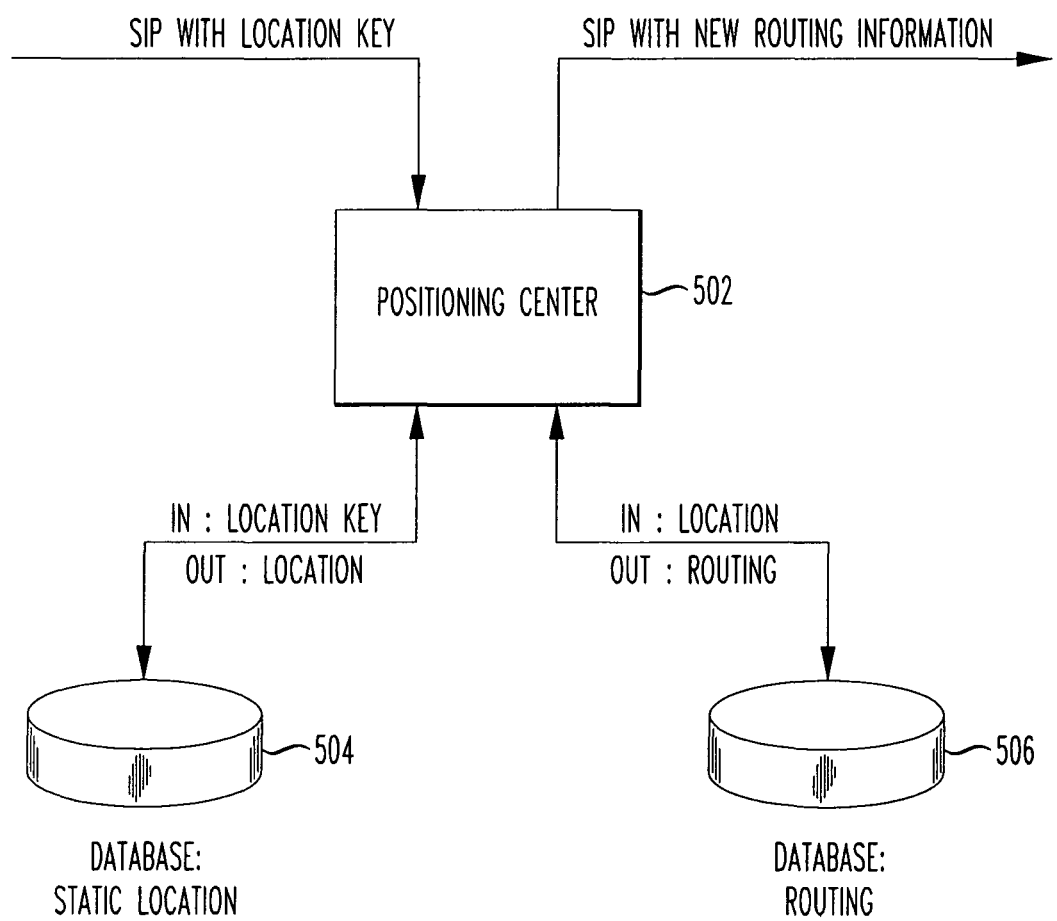

ANCILLARY DATA SUPPORT IN SESSION INITIATION PROTOCOL (SIP) MESSAGING

The present application claims priority from U.S. application Ser. No. 12/292,921, filed Dec. 1, 2008, entitled "Ancillary Data Support in Session Initiation Protocol (SIP) Messaging, now U.S. Pat. No. 7,929,530; which in turn claims priority from U.S. Provisional Appl. No. 60/996,700, filed Nov. 30, 2008, entitled "Ancillary Data Reference For Session Initiation Protocol (SIP)", to Marshall et al., the entirety of both of which are expressly incorporated herein by reference.

BACKGROUND OF THE INVENTION

1. Field of the Invention

This invention relates generally to communications networks. More particularly, it relates to telecommunications networks including Voice Over Internet Protocol (VoIP) network communications, and most particularly to SIP (Session Initiation Protocol) emergency service messaging via IP telecommunications for voice, video, and text.

2. Background of the Related Art

Session Initiation Protocol (SIP) is a basic protocol for initiating interactive communication sessions (e.g., voice, video, chat, interactive games, virtual reality, etc.) between users. In given SIP-based applications, location of a particular wireless device is desired or required.

Currently, location and other caller-related data for the majority of calls (VoIP, cellular, or landline) is delivered or determined through multiple mechanisms. For instance, location and other data for the majority of calls is determined via the use of a unique query key (such as the telephone number or uniform resource identifier (URI)) to perform a database lookup. In these architectures, the unique query key (e.g., telephone number or URI) is used as a lookup element to query provisioned, staged or static information (e.g., from a suitable database) outside of the actual call signaling for location information. An exemplary technique and apparatus to inject a location object into a routing SIP message is disclosed in co-owned U.S. patent application Ser. No. 11/902,845, filed Sep. 26, 2007, the entirety of which is expressly incorporated herein by reference.

FIG. 3 shows a conventional exemplary Voice over Internet Protocol (VoIP) based routing architecture for a given Session Initiation Protocol (SIP) message.

In particular, as shown in FIG. 3, a Session Internet Protocol (SIP) message includes a unique query key, or location key (e.g., telephone number or URI) to be used to determine an action based on the initiator's location (i.e., position). As shown in FIG. 3, the SIP message including the unique query (e.g., location) key is passed to a positioning center 502.

Using the received location key, the positioning center 502 passes a query to an appropriate database 504, e.g., a database associating static location with various location key information. The static location database 504 determines the desired location information relating to the input location key, and returns the static location to the requesting positioning center 502.

Then, having obtained appropriate location information, the positioning center 502 passes a request to another database, e.g., a routing database 506, to obtain routing information associated with the received location information. The routing database 506 outputs appropriate routing information to the requesting positioning center 502. At that point, the positioning center 502 passes on the SIP message together with new routing information obtained from the routing database 506.

Standards development groups have created a mechanism for providing location associated to an endpoint or anchor point within a SIP session ("call"). Moreover, discussions have taken place promoting the idea of providing a limited set of URIs (Uniform Resource Identifiers) with the SIP messaging.

But a mechanism has not been heretofore provided to provide associated "ancillary" data with the call. The present inventors realize that such a mechanism is desired to support emergency calling as a primary application, and could be extended into commercial uses.

Disadvantages of the prior technology includes, e.g., providing a limited set of URIs, is not sufficient to cover all known or eventual types of data that are or will be required. Moreover, by providing URIs only, there is no provision for including (embedding) ancillary data within the SIP body part. Furthermore, body part(s) as a separate package can be easily encrypted while the headers remain in plain text. (Providing one or more URIs as the only option cannot ensure that the data associated with it will be delivered in an encrypted or digitally signed manner, whereas a mechanism for embedding the data within the SIP message itself allows for its encryption and/or digital signature as required.)

SUMMARY OF THE INVENTION

In accordance with the principles of the present invention, a Session Initiation Protocol (SIP) proxy server for facilitating inclusion of auxiliary data along with location in a SIP session comprises a first communication path to receive a SIP message from an initiator of the SIP message. A proxy module associates auxiliary information identified in a SIP header of the SIP message with the received SIP message. A second communication path provides access to a recipient of the SIP message. In this way, aside from the association to the auxiliary information, the SIP message further includes current location information relating to a current position of the initiator.

BRIEF DESCRIPTION OF THE DRAWINGS

Features and advantages of the present invention will become apparent to those skilled in the art from the following description with reference to the drawings which:

FIG. 3 shows a conventional exemplary Voice over Internet Protocol (VoIP) based routing architecture.

DETAILED DESCRIPTION OF ILLUSTRATIVE EMBODIMENTS

The present invention diverges from current NENA standards by providing ancillary data via a finite set of highly constrained universal resource indicators (URIs) (e.g., carrier_name_address@somedomain.com).

The present invention leverages the model already created for associated location in SIP, (e.g., Presence Identity Document Format-Location Object (PIDF-LO)), we specify a new technique, based on an XML/tagged structure, and for the provision of ancillary data associated with a call, aside from location, within the SIP header.

The invention utilizes techniques standardized in the Internet Engineering Task Force (IETF) for transporting location, but that in accordance with the invention, ancillary information, aside from or in addition to location associated with an emergency SIP session (call), is transported in a SIP header.

Figure 1:
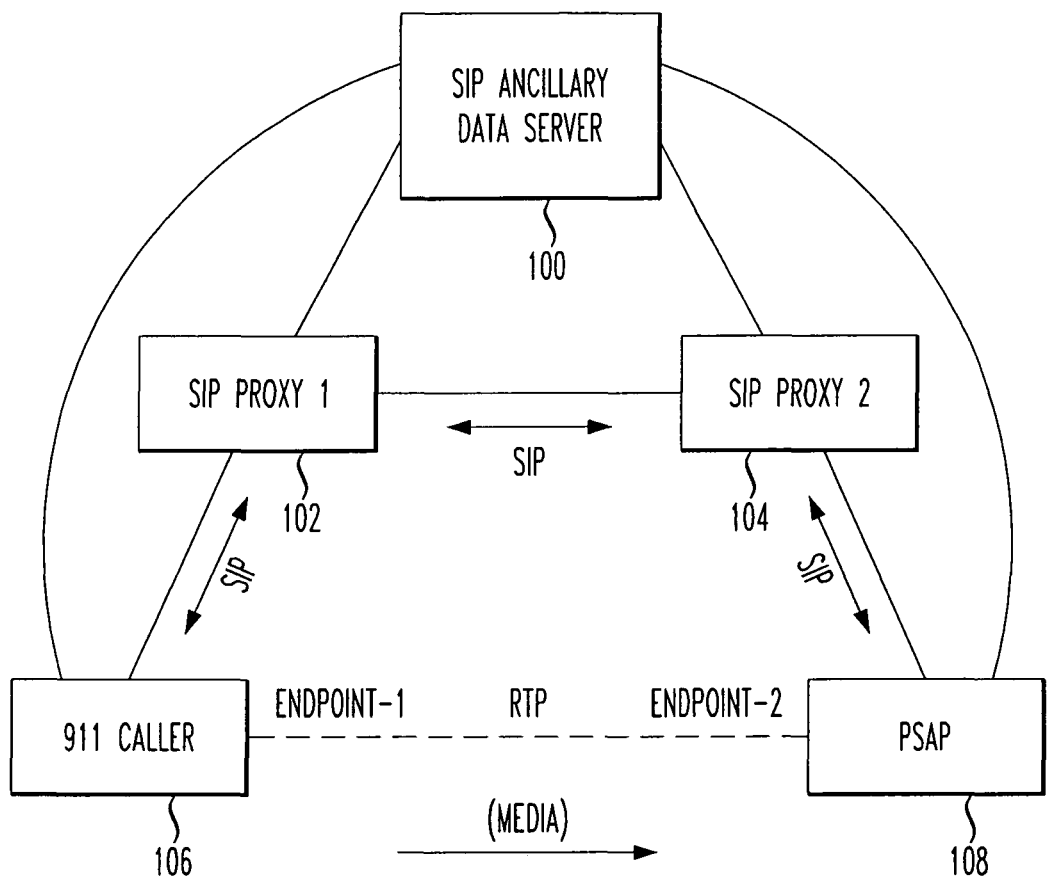
FIG. 1 shows inclusion of a SIP ancillary data server for temporarily hosting auxiliary data for an emergency SIP session (call) uniquely referred to in a transported SIP header, in accordance with the principles of the present invention.

FIG. 1 shows inclusion of a SIP ancillary data server for temporarily hosting auxiliary data for an emergency SIP session (call) uniquely referred to in a transported SIP header, in accordance with the principles of the present invention.

In particular, as shown in FIG. 1, a SIP ancillary data server 100 hosts ancillary data (e.g., a photo of an emergency scene, live streaming video from an emergency scene, a medical history of a patient in need of emergency care, etc.) The hosted data may be live (e.g., streaming video), may be pseudo-live (e.g., a video or photo taken at the emergency scene, uploaded to an appropriate hosting site (the SIP ancillary data server 100), or may be static (e.g., a medical history). Moreover, the hosted data may or may not be retained within a common platform, i.e., within a single SIP ancillary data server 100.

In the given example of an emergency SIP session (call), an emergency caller 106 establishes a SIP session with an emergency services center functioning as a first SIP proxy 102. Using techniques outside of the present invention, an appropriate public service access point (PSAP) 108 is determined based on a location of the emergency caller 106. The emergency caller 106 then establishes a SIP session (call) with the appropriate PSAP 108 via respective SIP proxies 102, 104.

Figure 2:
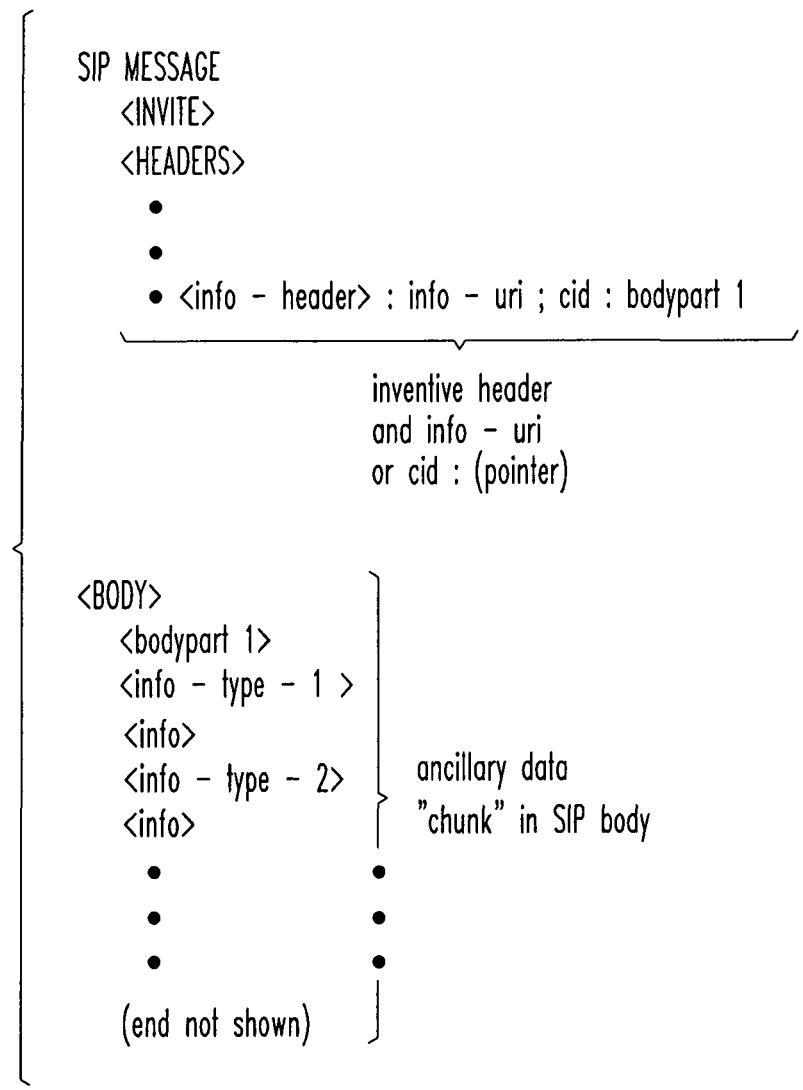
FIG. 2 shows an exemplary SIP message format, in accordance with the principles of the present invention.

FIG. 2 shows an exemplary SIP message format, in accordance with the principles of the present invention.

In particular, as shown in FIG. 2, in accordance with the principles of the present invention, in a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

The content pointer (cid:) element makes reference to a structured XML form contained within the SIP message body.

The content <information_URI> (info_URI) makes reference to an external service (e.g., to the SIP ancillary data server 100 shown in FIG. 1) which contains ancillary information. Alternatively, the info_URI may provide a level of redirection to the information (e.g., a universal resource identifier (URI)).

The ancillary information, whether embedded locally in the SIP message, or provided (via request or response to a request) based on the info_URI, is preferably structured as XML/tagged data. The ancillary information is referred to herein collectively as an information object (IO).

The information object (IO) document structure preferably includes one or more sections representing any of many types of ancillary information.

The information object (IO) document is preferably arranged sequentially by Information Type, (e.g., Medical data, Measurement data, Statistics, Profile information, or Multimedia-related information). Preferably, the information object (IO) is infinitely extensible to contain any number of information data types.

The (IO) information object may contain actual data, or one or more reference URIs pointing to some data service, or any combination of both. For instance, as shown in FIG. 1, the IO information object may point to ancillary data temporarily hosted in a SIP ancillary data server 100.

The invention permits ancillary data of any kind to be linked to an emergency SIP call. Moreover, any of the varying types of ancillary data can be registered as standard data types (e.g., IANA Registry).

While shown and described with reference to an emergency SIP call, the principles of the present invention are extensible to any SIP session, including non-emergency cases.

The information within the SIP body can be encrypted and/or digitally signed as required.

Potential current markets for the invention include, for example, Voice over Internet Provider (VoIP) service providers, emergency service providers, or information service providers.

Those that may make particular use of the invention include any/all communications users, including VoIP, wireless and/or landline users, as well as VoIP service providers.

While the invention has been described with reference to the exemplary embodiments thereof, those skilled in the art will be able to make various modifications to the described embodiments of the invention without departing from the true spirit and scope of the invention.

What is claimed is:

1. A Session Initiation Protocol (SIP) proxy server for facilitating inclusion of auxiliary data in a SIP session, comprising:
    a first communication path, from an initiator device, to receive an emergency SIP message including an extended header comprising current location information of said initiator device and a uniform resource identifier referencing an external source device providing auxiliary emergency information associated with said emergency SIP message;
    an auxiliary information module to obtain said auxiliary emergency information from a server addressed by said uniform resource identifier; and
    a second communication path to communicate said auxiliary emergency information associated with said emergency SIP message, to a recipient device.

2. The Session Initiation Protocol (SIP) proxy server for facilitating inclusion of auxiliary data in a SIP session according to claim 1, wherein:
    said uniform resource identifier (URI) relates to an IP address of said auxiliary emergency information.

3. The Session Initiation Protocol (SIP) proxy server for facilitating inclusion of auxiliary data in a SIP session according to claim 1, wherein:
    said emergency SIP message corresponds to an emergency Voice over Internet Protocol (VoIP) call.

4. The Session Initiation Protocol (SIP) proxy server for facilitating inclusion of auxiliary data in a SIP session according to claim 1, wherein:
    said auxiliary emergency information comprises audio relating to said emergency SIP message.

5. The Session Initiation Protocol (SIP) proxy server for facilitating inclusion of auxiliary data in a SIP session according to claim 1, wherein:
    said auxiliary emergency information comprises video relating to said emergency SIP message.

6. The Session Initiation Protocol (SIP) proxy server for facilitating inclusion of auxiliary data in a SIP session according to claim 1, wherein:
    said auxiliary emergency information comprises textual data.

7. The Session Initiation Protocol (SIP) proxy server for facilitating inclusion of auxiliary data in a SIP session according to claim 1, wherein:
said universal resource identifier comprises a universal resource locator (URL) of a web site containing information relating to said emergency SIP message.

8. The Session Initiation Protocol (SIP) proxy server for facilitating inclusion of auxiliary data in a SIP session according to claim 1, wherein:
said initiator device of said emergency SIP message is a wireless device.

9. The Session Initiation Protocol (SIP) proxy server for facilitating inclusion of auxiliary data in a SIP session according to claim 1, wherein:
a form of said uniform resource identifier is <information_URI>.

10. A method of facilitating inclusion of auxiliary data in a Session Initiation Protocol (SIP) session, comprising:
receiving, from an initiator device, an emergency SIP message including an extended header comprising current location information of said initiator device and a uniform resource identifier referencing an external source device providing auxiliary emergency information associated with said emergency SIP message;
obtaining said auxiliary emergency information from a server addressed by said uniform resource identifier; and
establishing a second communication path to communicate said auxiliary emergency information associated with said emergency SIP message, to a recipient device.

11. The method of facilitating inclusion of auxiliary data in a Session Initiation Protocol (SIP) session according to claim 10, wherein:
said uniform resource identifier (URI) relates to an IP address of said auxiliary emergency information.

12. The method of facilitating inclusion of auxiliary data in a Session Initiation Protocol (SIP) session according to claim 10, wherein:
said emergency SIP message corresponds to an emergency Voice over Internet Protocol (IP) call.

13. The method of facilitating inclusion of auxiliary data in a Session Initiation Protocol (SIP) session according to claim 10, wherein:
said auxiliary emergency information comprises audio relating to said emergency SIP message.

14. The method of facilitating inclusion of auxiliary data in a Session Initiation Protocol (SIP) session according to claim 10, wherein:
said auxiliary emergency information comprises video relating to said emergency SIP message.

15. The method of facilitating inclusion of auxiliary data in a Session Initiation Protocol (SIP) session according to claim 10, wherein:
said auxiliary emergency information comprises textual data relating to said emergency SIP message.

16. The method of facilitating inclusion of auxiliary data in a Session Initiation Protocol (SIP) session according to claim 10, wherein:
said universal resource identifier comprises a universal resource locator (URL) of a web site containing information relating to said emergency SIP message.

17. The method of facilitating inclusion of auxiliary data in a Session Initiation Protocol (SIP) session according to claim 10, wherein:
said initiator device of said emergency SIP message is a wireless device.

18. The method of facilitating inclusion of auxiliary data in a Session Initiation Protocol (SIP) session according to claim 10, wherein:
a form of said uniform resource identifier is <information_URI>.

\* \* \* \* \*